United States Patent
Lindoff et al.

(10) Patent No.: US 7,680,176 B2
(45) Date of Patent: Mar. 16, 2010

(54) SIMPLIFIED GENERALIZED RAKE RECEIVER METHOD AND APPARATUS

(75) Inventors: Bengt Lindoff, Bjärred (SE); Bo Bernhardsson, Lund (SE); Jonas Ohlsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 993 days.

(21) Appl. No.: 11/412,543

(22) Filed: Apr. 27, 2006

(65) Prior Publication Data

US 2007/0116100 A1    May 24, 2007

Related U.S. Application Data

(60) Provisional application No. 60/738,459, filed on Nov. 21, 2005.

(51) Int. Cl.
*H04B 1/69* (2006.01)
(52) U.S. Cl. .................. 375/148; 375/144; 375/150; 370/335; 370/342; 455/114.2; 455/67.11
(58) Field of Classification Search .......... 375/148, 375/144, 150; 455/63.1, 114.2, 67.11; 370/335, 370/342
See application file for complete search history.

(56) References Cited

U.S. PATENT DOCUMENTS

| | | | |
|---|---|---|---|
| 6,801,565 B1 | 10/2004 | Bottomley et al. | |
| 6,944,434 B2* | 9/2005 | Mattellini et al. | 455/296 |
| 2001/0028677 A1 | 10/2001 | Wang et al. | |
| 2002/0034270 A1* | 3/2002 | Ylitalo | 375/346 |
| 2003/0086482 A1 | 5/2003 | Shimizu et al. | |
| 2005/0058183 A1 | 3/2005 | Ogawa et al. | |
| 2005/0123026 A1 | 6/2005 | Hasegawa et al. | |
| 2006/0063505 A1* | 3/2006 | Cairns | 455/302 |

FOREIGN PATENT DOCUMENTS

WO    WO 2005/096517    10/2005

OTHER PUBLICATIONS

Hasegawa, T. and Shimizu, M., "Multipath Interference Reduction Method using Multipath Interference Correlative Timing for DS-CDMA Systems." Proceedings of Vehicular Technology Conference. May 6-9, 2002. pp. 1205-1209. vol. 3.
Hasegawa, T. and Shimizu, M. "Multipath Interference Reduction Property by Using Multipath Interference Correlative Timing Throughout for DS-CDMA Systems." Proceeding of Vehicular Technology Conference. Apr. 22-25, 2003. pp. 2827-2831. vol. 4.

* cited by examiner

*Primary Examiner*—Chieh M Fan
*Assistant Examiner*—Eva Y Puente
(74) *Attorney, Agent, or Firm*—Coats & Bennett, PLLC

(57) ABSTRACT

According to a method and apparatus taught herein, a Rake receiver circuit selectively operates with or without colored interference compensation, in dependence on current operating conditions. For example, in one embodiment the Rake receiver circuit comprises one or more processing circuits that are configured to generate Rake combining weights in a first mode of operation as first combining weights calculated from channel estimates corresponding to a set of Rake signal fingers. In a second mode, the processing circuit(s) generate the Rake combining weights as compensated combining weights obtained by compensating the first combining weights with second combining weights calculated from colored interference estimates corresponding to a set of Rake probing fingers.

30 Claims, 3 Drawing Sheets

SIMPLIFIED GENERALIZED RAKE RECEIVER METHOD AND APPARATUS

RELATED APPLICATIONS

This application claims priority under 35 U.S.C. §119(e) from the provisional patent application entitled "G-Rake Ultra Light," filed on 21 Nov. 2005 and assigned Ser. No. 60/738,459, and which is incorporated herein by reference.

BACKGROUND

The present invention generally relates to wireless communications, and particularly relates to selective colored interference suppression in a Rake-based communication receiver.

As a general proposition, a Code Division Multiple Access (CDMA) transmitter transmits K CDMA signals in parallel as a composite signal. An individual receiver recovers the ith one of these K signals by correlating the composite received signal with the ith one of the CDMA spreading codes used to generate the K CDMA signals. In this context, a "standard" RAKE receiver aligns each of one or more Rake "fingers" with the strongest multipath components of the received composite signal, despreads the selected multipath signals, and combines the finger signals to obtain a (Rake) combined signal for further processing.

The combining process involves the application of combining weights to the finger signals and a standard Rake receiver forms the combining weights as conjugates of the finger channel estimates, weighted according to multipath signal strength. Thus, the standard Rake receiver operates as a maximal ratio combiner but its performance is optimal only under white noise conditions.

In more detail, in the nominal case, the correlation process carried out in each finger cleanly recovers the desired ith signal and suppresses the remaining K−1 interfering signals. However, receiving multiple copies of the composite signal on different delay paths results in a loss of orthogonality between the K spreading codes and each finger signal thus includes some impairment arising from intra-cell interference, also called multiple access interference (MAI). These impairments exhibit cross-correlations because of the inherent correlations between the received multipath signals.

Generalized Rake (G-Rake) receivers offer improvements over the standard Rake receiver by incorporating knowledge of the impairment correlations into the combining weights. More particularly, G-Rake receivers measure or otherwise estimate the signal impairment cross-correlations for the different multipath delays and use that information to generate the combining weights in a manner that provides colored noise suppression as part of the Rake combining process.

SUMMARY

According to a method and apparatus taught herein, a Rake receiver circuit selectively operates with or without colored interference compensation, in dependence on current operating conditions. For example, one embodiment of the Rake receiver circuit operates in a first mode without colored interference compensation and in a second mode with colored interference compensation. In the first mode, the Rake receiver circuit generates output signals from a set of Rake signal fingers based on channel estimates corresponding to the Rake signal finger positions. In the second mode, the Rake receiver circuit generates the output signals from the set of Rake signal fingers by combining at least selected ones of the output signals with interference estimates obtained from corresponding ones in a set of Rake probing fingers.

One Rake receiver circuit embodiment for carrying out the above processing comprises one or more processing circuits that are configured to generate Rake combining weights for combining the output signals from the Rake signal fingers differently in the first and second modes. In the first mode, the Rake receiver circuit generates the Rake combining weights as first combining weights calculated from channel estimates corresponding to the set of Rake signal fingers. In the second mode, the Rake receiver circuit generates the Rake combining weights as compensated combining weights obtained by compensating the first combining weights with second combining weights calculated from colored interference estimates corresponding to the set Rake probing fingers.

In one embodiment, the second combining weights are calculated from colored interference estimates obtained by placing a Rake probing finger at a delay position relative to each of one or more strongest Rake signal finger positions. Processing obtains a compensated combining weight for each Rake signal finger by combining the corresponding first and second combining weights, e.g., by subtractive combining. In at least one embodiment, the first combining weights corresponding to the two strongest Rake signal fingers are compensated for colored interference.

One or more embodiments include a scaling factor in the colored interference estimates used to form the second combining weights. Thus, adjusting the scaling factor controls whether and to what extent colored interference compensation is used, by controlling the contribution of the second combining weights. At least one embodiment adjusts the scaling factor as a function of current operating conditions at the communication receiver in which the Rake receiver circuit is included. For example, no colored interference compensation may be used below certain received signal qualities, or above certain received signal spreading factors. It will be understood that these and other operating conditions may be evaluated alone or in any combination as a basis for controlling colored interference compensation.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
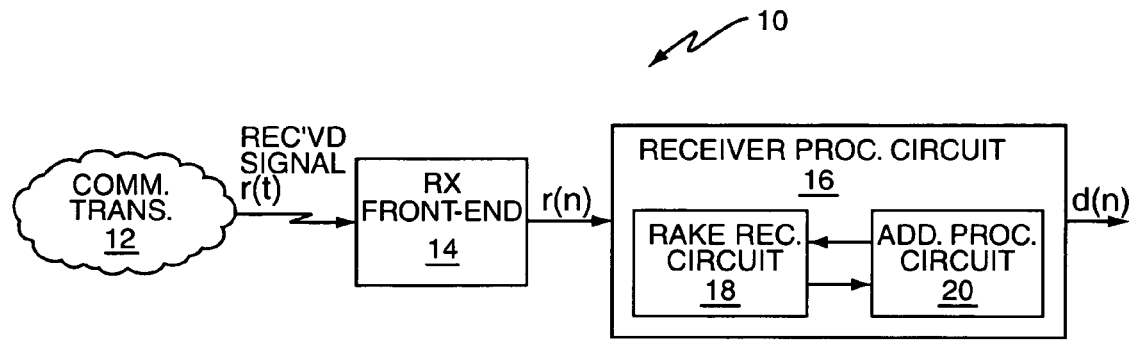
FIG. 1 is a block diagram of one embodiment of a communication receiver.

FIG. 1 illustrates a wireless communication receiver 10 configured to perform selective colored interference compensation as part of its Rake receiver-based received signal processing operations. In this context, colored interference suppression connotes the suppression of colored interference arising from receiving a composite signal including multiple code-multiplexed data signals over a time-dispersive channel—e.g., interference arising from multipath reception of CDMA signals in a wireless communication network. Such interference includes Multiple Access Interference (MAI) and self-interference associated with receiving multiple copies of the desired signal, and is referred to collectively as intra-cell interference.

More generally, colored interference, including intra-cell interference, exhibits correlations across the multipath components of the received signal r(t), meaning that interference across Rake signal finger outputs in the Rake receiver circuit 18 is correlated. Colored interference thus can be suppressed by characterizing the impairment cross-correlations and incorporating knowledge of these correlations into the Rake combining weights used to combine the output signals output by the Rake signal fingers. Details more fully illustrating "Generalized" Rake receiver techniques, wherein Rake combining weights incorporate knowledge of correlated interference for interference suppression, appear in U.S. Pat. No. 6,363,104 to Bottomley and in U.S. Published Patent App. 2006/0007990 to Cozzo, both of which documents are incorporated herein by reference.

With the above Generalized Rake receiver colored interference suppression methods in mind, the communication receiver 10 receives a multipath CDMA communication signal, r(t), from a communication transmitter 12, and conditionally applies colored interference suppression as part of its Rake-based despreading of the received signal. To that end, the illustrated embodiment of the communication receiver 10 includes a receiver front-end circuit 14, which is configured to produce a digital baseband signal, r(n), from the received signal r(t), and receiver processing circuits 16, including one or more processing circuits configured as a Rake receiver circuit 18 and additional processing circuits 20. The additional processing circuits 20 include, for example, one or more decoding circuits to extract transmitted information, d(n), from the output signal provided by the Rake receiver circuit 18.

Figure 2:
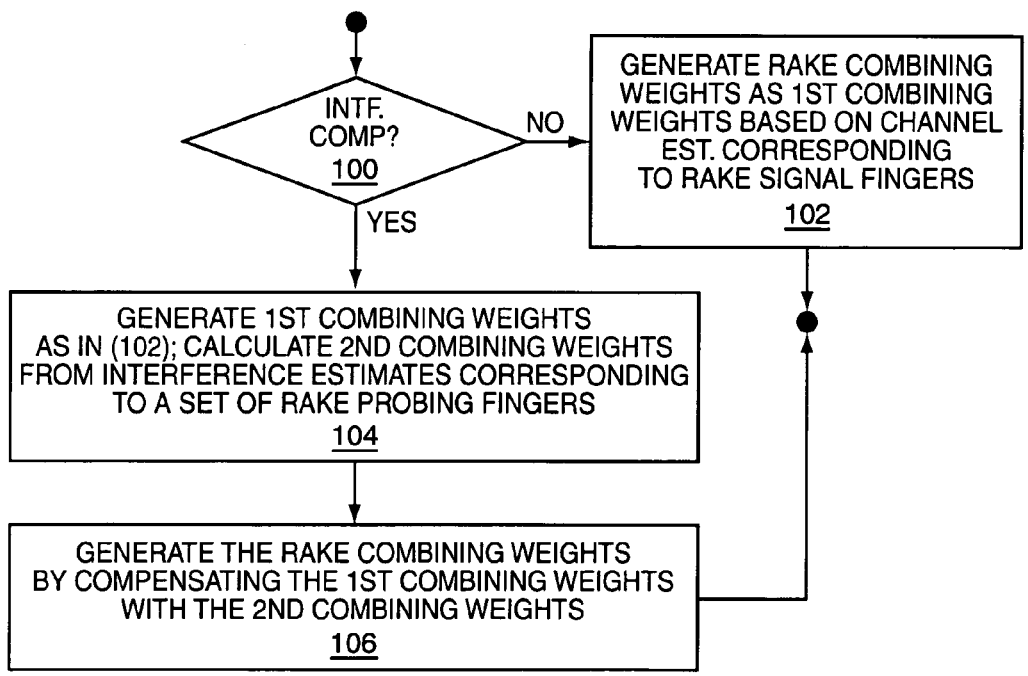
FIG. 2 is a logic flow diagram of one embodiment of selective, Rake-based colored interference compensation processing logic.

In one embodiment, the Rake receiver circuit 18 effectively operates as a modal Rake receiver. FIG. 2 illustrates one embodiment of modal processing logic, which may be implemented in the Rake receiver circuit 18, via hardware, software, or any combination thereof. Processing begins with a determination of whether colored interference compensation is desirable (Step 100). If not, the Rake receiver circuit 18 operates in a first mode wherein it generates Rake combining weights as first combining weights calculated from channel estimates corresponding to a set of Rake signal fingers (Step 102). In other words, the Rake receiver circuit 18 forms the Rake combining weights as conjugates of the complex channel responses determined for the multipath signals despread by the Rake receiver circuit 18 for the received signal r(t).

However, if colored interference compensation is desired, the Rake receiver circuit 18 operates in a second mode wherein the Rake receiver circuit 18 generates the Rake combining weights as compensated combining weights obtained by calculating the first combining weights as above (Step 104), and compensating the first combining weights with second combining weights (Step 106). The Rake receiver circuit 18 calculates the second combining weights from colored interference estimates corresponding to a set Rake probing fingers. In this context, Rake "signal" fingers are Rake fingers aligned with detected multipath components of the received signal, and "probing" fingers are Rake fingers that are offset from the signal paths (off-path). Probing fingers thus support colored interference characterization, as detailed later herein.

In either mode (first or second), the Rake receiver circuit 18 forms a Rake combined signal for further received signal processing by combining signal finger output signals from the Rake signal fingers according to the Rake combining weights. In the first mode, these Rake combining weights do not incorporate knowledge of colored interference and thus do not offer suppression of such interference present in the output signals from the Rake signal fingers. In the second mode, the Rake combining weights incorporate knowledge of colored interference—i.e., they account for impairment correlations across the Rake signal fingers—and thus provide at least some suppression of such interference in the Rake combined signal. Further, in the colored interference suppression mode of operation, as will be detailed later herein, suppression may be applied, for example, to the output from the two strongest Rake signal fingers. Further, the degree or extent to which suppression is applied may be scaled as a function of current signal conditions.

Figure 3:
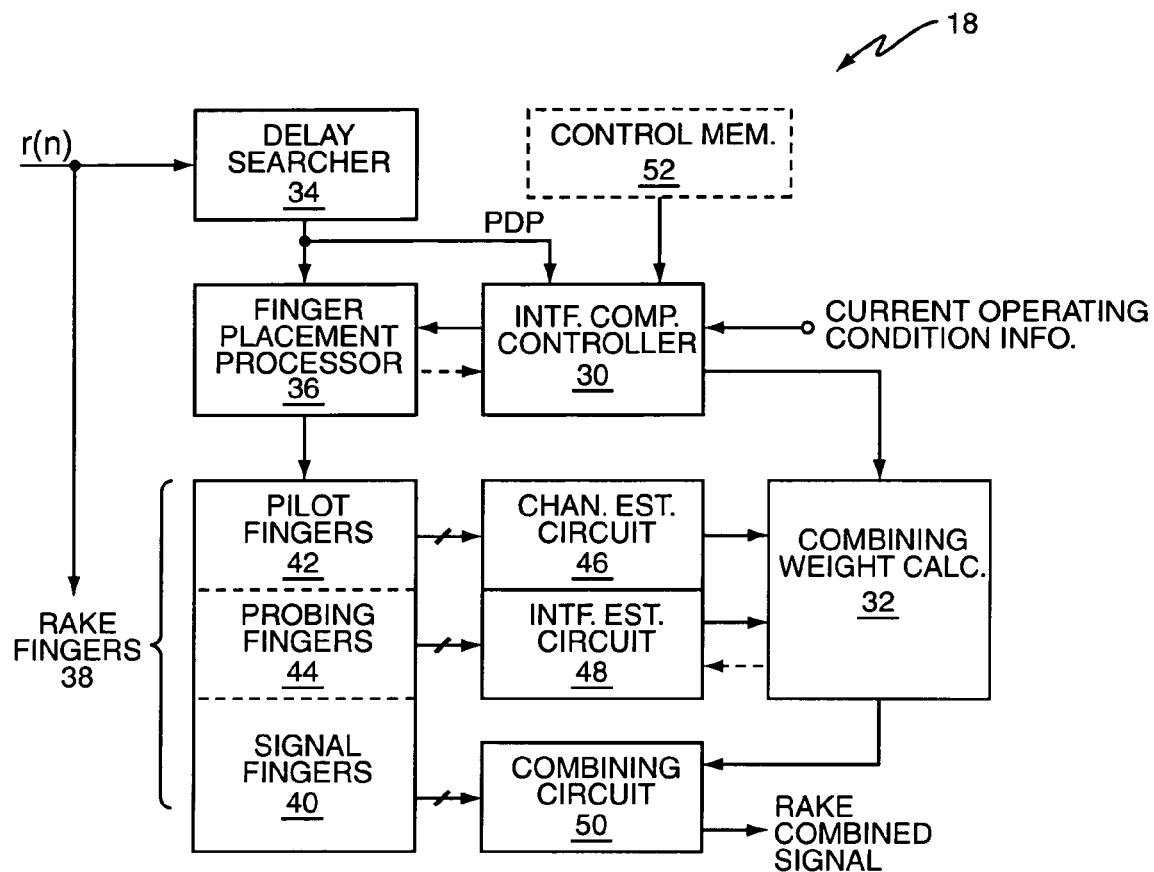
FIG. 3 is a block diagram of one embodiment of a Rake receiver circuit configured for selective colored interference compensation.

FIG. 3 illustrates one embodiment of the Rake receiver circuit 18, which is configured to support operation in interference suppression mode and non-interference suppression mode. Those skilled in the art will appreciate that the illustrated architecture represents a non-limiting implementation example, and that other circuit arrangements may be used. Further, those skilled in the art will appreciate that the circuit elements of FIG. 3 may be functional circuit elements rather than physical circuit elements. For example, at least some of the illustrated processing logic may be implemented in software or firmware for execution by a microprocessor, digital signal processor, ASIC, or other digital processing element.

With this flexibility in mind, one sees that the illustrated embodiment of the Rake receiver circuit 18 comprises an interference compensation controller 30, a combining weight calculator 32, a delay searcher 34, a finger placement processor 36, and a plurality of Rake fingers 38, including signal fingers 40, pilot fingers 42, and probing fingers 44. The Rake receiver circuit 18 further includes a channel estimation circuit 46, an interference estimation circuit 48, a Rake combining circuit 50, and, optionally, included or associated memory 52.

Figure 4:
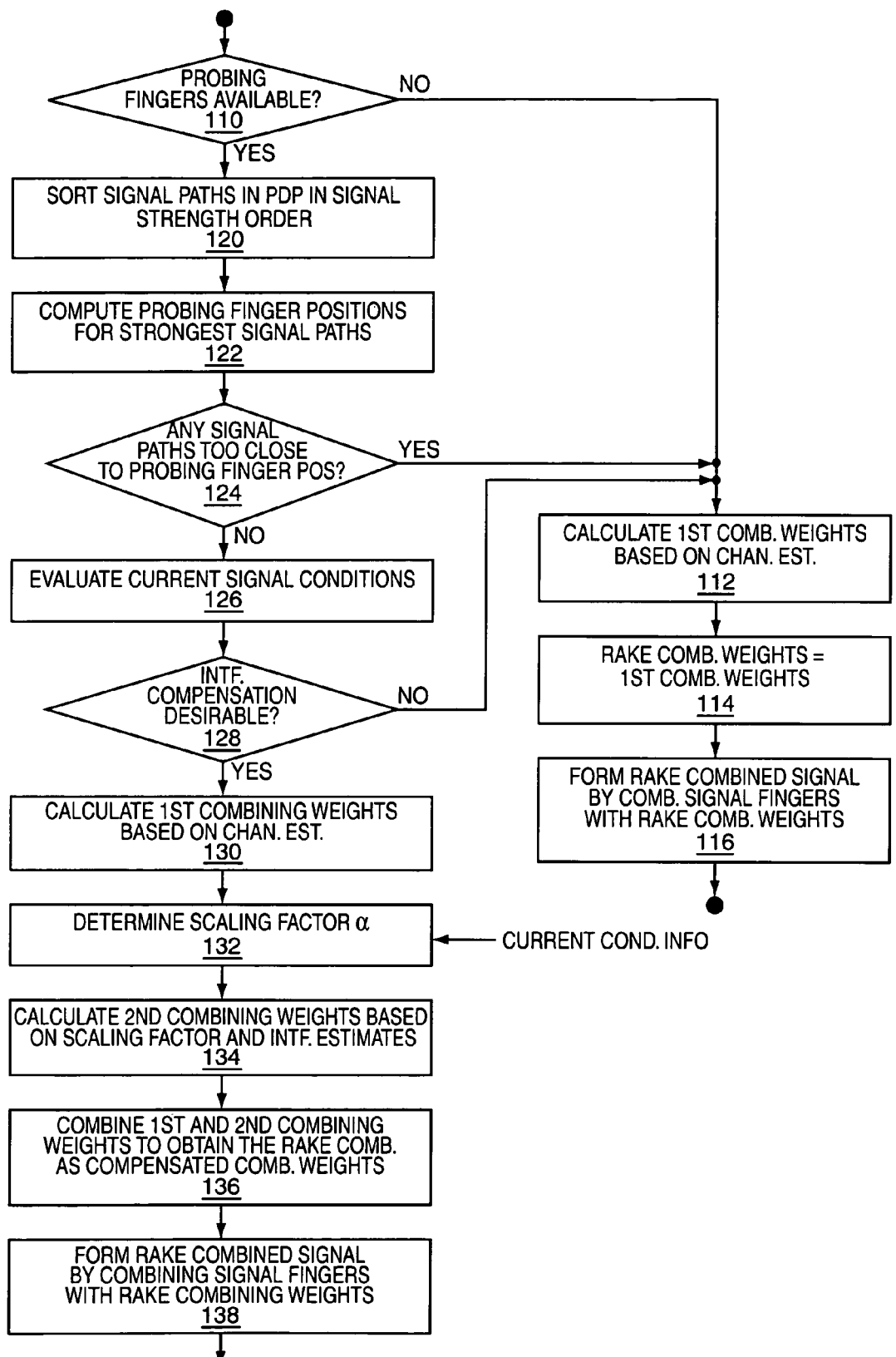
FIG. 4 is a logic flow diagram of one embodiment of selective, Rake-based colored interference compensation processing logic.

FIG. 4 illustrates one embodiment of processing logic for a method of selective colored interference compensation that may be implemented by way of non-limiting example in the Rake receiver circuit 18 of FIG. 3. Processing begins with the interference compensation controller 30 determining whether any probing fingers 44 are available for probing, i.e., available for characterizing colored interference in the received signal (Step 110). If no probing fingers 44 are available, the interference compensation controller 30 configures the combining weight calculator 32 to compute the Rake combining weights as first combining weights based on channel estimates from the channel estimation circuit 46 corresponding to the delay paths of the strongest multipath signal components in the received signal r(n) (Steps 112 and 114). The combining circuit 50 thus generates the Rake combined output signal by combining the output signals from the Rake signal fingers 40 using combining weights that do not incorporate colored interference cancellation components (Step 116).

Rake probing fingers 44 may not be available because, for example, the Rake fingers 38 may be fungible, i.e., interchangeably assignable as signal fingers, probing fingers, and/or pilot fingers. Thus, the number of Rake fingers 38 consumed for signal decoding, and the corresponding number of Rake fingers 38 needed for corresponding (pilot) channel estimation, may be such that an insufficient number of Rake fingers 38 are available for probing at off-path delays. Multi-coded reception where the received signal r(n) includes two or more CDMA streams targeted to the communication receiver 10 stands as one example where the number of needed signal and pilot fingers may be large. Other finger-hungry reception examples include diversity decoding embodiments of the communication receiver 10, wherein one or more antenna-received signals are decoded using spatial diversity and/or temporal diversity. Of course, the number of probing fingers 44 currently available for characterizing colored interference for a given CDMA signal of interest may vary even if the Rake fingers 38 are not fungible.

Figure 5:
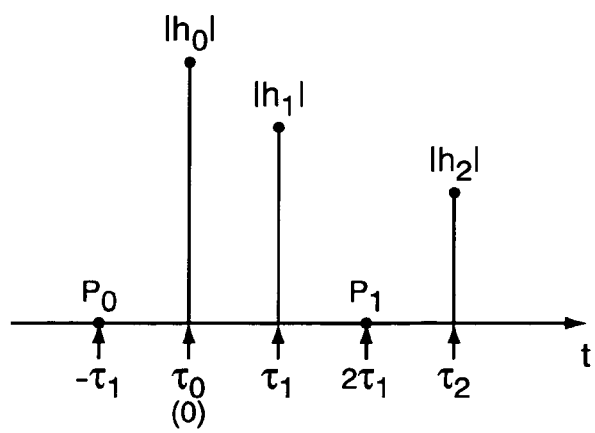
FIG. 5 is a graph of a hypothesized power delay profile for a received multipath signal to which selective colored interference compensation is applied.

In any case, if probing fingers 44 are available (Step 110), processing continues with sorting the signal paths identified in the Power Delay Profile (PDP) from the delay searcher 34. FIG. 5 illustrates a hypothetical PDP, wherein the CDMA signal of interest exhibits correlation peaks at path delays $\{\tau_0, \tau_1, \tau_2\}$, where $\tau_0$ (here normalized to zero for simplicity) is the direct path or reference delay. The finger placement processor 36 assigns a signal finger 40 to each of the path delays $\{\tau_0, \tau_1, \tau_2\}$ and assigns a pilot finger 42 to each of the path delays $\{\tau_0, \tau_1, \tau_2\}$. In this manner, the pilot fingers 42 provide corresponding channel information to the channel estimation circuit 46, which generates corresponding channel estimates $\{h_0, h_1, h_2\}$.

Processing continues with the interference compensation controller 30 and/or the finger placement processor 36 sorting the signal paths in the PDP in order of strength (Step 120) and calculating probing finger positions for one or more of the strongest ones of the signal paths (Step 122). In at least one embodiment, probing finger positions are calculated at desired delay offsets relative to the two strongest Rake signal finger positions. With respect to FIG. 5, one sees the calculation of delay offset $-\tau_1$ for the placement of probing finger $p_0$, corresponding to the channel estimate $h_0$, and the calculation of delay offset $2\tau_1$ for the placement of probing finger $p_1$, corresponding to the channel estimate $h_1$. If $\tau_0 \neq 0$, then the offset would be $\tau_0 - \tau_1$ for probing finger $p_0$ and $\tau_0 - 2\tau_1$ for probing finger $p_1$.

The interference compensation controller 30 and/or the finger placement processor 36 evaluates the calculated probing finger positions and determines whether they are too close to any signal paths. That is, processing continues with an evaluation of whether one or more desired Rake probing finger locations are within a defined delay range of one or more Rake signal finger locations (Step 124). If so, processing jumps to a first mode of combining weight generation (Step 112) for the determination of Rake combining weights without colored interference compensation. If not, processing continues with an optional evaluation of further current operating conditions (Step 126) as a basis for determining whether to generate the Rake combining weights in the first mode of operation without colored interference compensation, or in a second mode of operation with colored interference compensation (Step 128).

By way of non-limiting example, the interference compensation controller 30 may consider any one or more of current operating condition parameters as a basis for determining whether, or to what extent, colored interference compensation is desirable. By way of non-limiting example, the interference compensation controller 30 may evaluate any one or more of the following parameters: a soft handoff condition or status of the communication receiver 10, a received signal quality, a received signal strength, and a received signal spreading factor. For example, the interference compensation controller 30 may be programmed to select the first mode of operation if the communication receiver 10 is in soft handoff, if the received signal strength is below a defined level, if the received signal quality is below a defined threshold, and/or if the received signal spreading factor is above a defined threshold, such as 64.

If the communication receiver 10 is in soft handoff, if the signal strength or quality is too low, or if the spreading factor is too high, processing jumps to the first mode of combining weight generation (Steps 112-116). That is, the interference compensation controller 30 causes the combining weight calculation circuit 32 to generate combining weights based on the channel estimates without colored interference compensation.

However, if colored interference compensation is desirable given current operation conditions, processing continues with the calculation of first combining weights, as in Step 112, based on the channel estimates corresponding to the path delays of the signal finger positions (Step 130). Processing continues with determining a scaling factor α (Step 132), for use in generating second combining weights, which incorporate colored interference compensation. Processing continues with calculation of the second combining weights (Step 134), based on the scaling factor and on colored interference estimates obtained from the interference estimation circuit 48, which receives output signals from the probing fingers 44 located at the selected probing finger positions.

Processing continues with the generation of compensated combining weights based on combining the first and second combining weights and forming the Rake combining weights for use by the combining circuit 50 as the compensated combining weights (Step 136). The Rake combined signal may then be provided to other circuits for further processing, e.g., decoding (Step 138). Thus, in this second mode of operation, the second combining weights incorporate colored interference suppression, the scaling factor determines the extent to which the second combining weights alter the first, channel-based combining weights, and Rake combining thus incorporates colored interference compensation to an extent controlled by the scaling factor α.

For example, in one or more embodiments, the scaling factor can be set to one of two selected values to control the operating mode. In one embodiment, setting the scaling factor to zero effectively selects the first mode of operation, where colored interference compensation is inactive. Conversely, setting the scaling factor to a non-zero value (e.g., "1") effectively selects the second mode of operation, where colored interference compensation is active. Moreover, controlling the scaling factor as a ranged value allows varying amounts of colored interference compensation. For example, the scaling factor can be varied according to changing signal qualities/strengths and/or spreading factors, such that more colored interference compensation is used when such compensation is more desirable, and less colored interference compensation is used when it is less desirable. Such operation is still modal in the sense that the scaling factor may, as a function of changing operating conditions, range to an end-point value that effectively results in substantially no colored interference compensation.

To better understand the above processing, a Rake receiver can be described as follows. Assume a multipath propagation channel of d taps and defined the d×1 channel vector as $$H_C = [h_0^C \ldots h_{d-1}^C]^T$$
$$H_D = [h_0^D \ldots h_{d-1}^D]^T \qquad \text{Eq. (1)}$$

where, in a Wideband CDMA (WCDMA) example, C denotes the Common Pilot Channel (CPICH) and D denotes the Dedicated Physical Channel (DPCH) on which a CDMA data signal is received. With the above, the vector of despread signals output by the Rake signal fingers 40 is given as $$Y = H_D u + E \qquad \text{Eq. (2)}$$

where $Y = [y_t, y_{t-\tau_1}, \ldots, y_{t-\tau_{d-1}}]$, u is the transmitted (data) symbol, E is a noise vector, $H_D$ is the DPCH channel vector, which is assumed to be constant over at least $N_C$ CPICH symbols.

The noise vector E may be represented as a diagonal covariance matrix using the expected value function, $E(\cdot)$, as $$\Sigma = E(EE^H) = \text{diag}(\sigma_1^2, \ldots, \sigma_{d-1}^2) \quad \text{Eq. (3)}$$

The channel $H_C$ and the variance elements in $\Sigma$ can be estimated using the despread values obtained from the pilot fingers 42, and CPICH $\Sigma$ thus determined can be scaled to the DPCH $\Sigma$ using the spreading factor difference between the DPCH and the CPICH. Thus, the channel estimates $\hat{H}_C$, as $$\hat{H}_C = H_C + E_{H_C}, \quad E_{H_C} \in N\left(0, \frac{SF}{256 N_C}\Sigma\right) \quad \text{Eq. (4)}$$

where $$\hat{\sum}_{ii} = \hat{\sigma}_i^2 = \frac{256}{SF} \cdot \frac{1}{N_C - 1} \sum_{k=1}^{N_C} |y_k^i - \hat{h}_C^i u_k^{CPICH}|^2, \quad \text{Eq. (5)}$$

$$i = 0, \ldots, d-1$$

where $\hat{H}_C = \{\hat{h}_C^i\} = 0, \ldots, d-1$ is the CPICH channel estimate vector, and $\hat{\sigma}_i^2$ is normalized such that $E(\hat{\sigma}_i^2) = \sigma_i^2$.

With the above in mind, the Rake receiver circuit 18 can operate without colored interference compensation by generating the channel and non-colored interference estimates as given above, such that the detector statistics—the Rake combined output signal from the combining circuit 50—are given as $$D_{RAKE} = \hat{H}_C^H \hat{\Sigma}^{-1} Y \quad \text{Eq. (6)}$$

Note that in the operating mode without colored interference compensation, it is only necessary for the Rake receiver 18 to estimate the interference for each multipath signal delay tap d, as represented by the diagonal matrix $\Sigma$. That is, the above processing only takes into account the noise power on a per tap basis, and thus performs optimally only if the noise is white, i.e., is not correlated across the delay taps used for the signal fingers 40 and pilot fingers 42.

For colored interference compensation, Generalized Rake processing places one or more probing fingers off-path, i.e., at locations in the PDP where there are no signal components, but where probing finger output signals may be used to characterize noise covariance across the delay taps d corresponding to the Rake signal finger positions. With the use of probing fingers, the despread vector Y includes probing finger signals and is given as $$Y = [y_t, y_{t-\tau_1}, \ldots, y_{t-\tau_{d-1}}, y_{t-\tau_{p0}} \ldots, y_{t-\tau_{p_{P-1}}}] \quad \text{Eq. (7)}$$

where $$\{y_{t-\tau_{p0}} \ldots, y_{t-\tau_{p_{P-1}}}\}$$

represent the set of probing finger outputs corresponding to probing finger positions at $\{\tau_{p0} \ldots, \tau_{p_{P-1}}\}$ in the PDP. With this approach, the noise vector E includes a noise covariance matrix $R = E(EE^H)$, which can be scaled to the DPCH by accounting for the CPICH/DPCH spreading factor difference. Thus, with colored interference consideration, the estimates of the channel vector and corresponding covariance matrix are given as $$\hat{H}_C = H_C + E_{H_C}, \quad E_{H_C} \in N\left(0, \frac{SF}{256 N_C} R\right) \quad \text{Eq. (8)}$$

and $$\hat{R} = \frac{256}{SF} \cdot \frac{1}{N_C - 1} \sum_{k=1}^{N_C} (Y_k - \hat{H}_C u_k^{CPICH})(Y_k - \hat{H}_C u_k^{CPICH})^H \quad \text{Eq. (9)}$$

where $\hat{R}$ is normalized such that $E(\hat{R}) = R$. Note that Eq. (9) represents a direct estimation of $\hat{R}$, but such colored interference determinations are non-limiting. For example, the Rake receiver circuit 18 can be configured to carry out a parametric estimation of the noise covariance for colored interference determination, such as taught by U.S. Published Patent App. 2006/0007990 to Cozzo. In any case, with use of the covariance matrix, the Rake detector statistics are given as $$D_{GRAKE} = \hat{H}_C^H \hat{R}^{-1} Y \quad \text{Eq. (10)}$$

In one or more embodiments, the Rake receiver 18 is configured to implement a simplified form of the above Generalized Rake processing, at least during operating times when colored interference compensation is desired. That is, the Rake receiver circuit 18 provides a mechanism for incorporating colored interference suppression into Rake combining weight generation that does not require the explicit estimation and inversion of a covariance matrix R, and thus offers significant advantages in terms of simplicity and computational efficiency over full G-Rake implementations, and potentially significant performance advantages over standard Rakes.

One embodiment of the Rake receiver circuit 18 offers the above advantages by placing probing fingers at delay offsets calculated relative to the strongest ones of the Rake signal finger positions. For example, the interference compensation controller 30 and/or the finger placement processor 36 may be configured to place probing finger $p_0$ and $p_1$ relative to the two strongest Rake signal finger positions. Referring back to FIG. 5 specifically, the Rake receiver 18 takes the three detected signal paths and ranks them in strength order. The Rake receiver circuit 18 places a probing finger at a desired delay offset relative to one or more of the strongest multipath signals. More particularly, in one embodiment, the Rake receiver circuit places a probing finger relative to each of the two strongest signal finger positions.

The interference compensation controller 30 and/or the finger placement processor 36 may, for example, calculate the probing finger placements by computing time delays which are the mirror of the time delay differences between the path delays for the two strongest multipath components in the received signal. For FIG. 5, the offsets would be calculated between the $\tau_0$ and the $\tau_1$ delays. Thus, the probing finger $p_0$ is positioned at delay $-\tau_1$ for the $\tau_0$ signal finger delay (for $\tau_0$ normalized to zero), and a similar computation is made for placement of the $p_1$ probing finger at the $2\tau_1$ signal finger delay. (Note that a corresponding number of pilot fingers 42 are placed at the signal delays for calculation of the corresponding channel estimates, $h_0$ and the $h_1$.)

With the above approach, scaled versions of the probing finger outputs, $p_0$ and $p_1$, can be subtracted from the corresponding signal finger outputs, $y_{t-\tau_0}$ and $y_{t-\tau_1}$, for colored interference compensation. This process is used to obtain new Rake signal finger outputs which are compensated for colored interference, and can be represented as $$y_{t-\tau_0}^{new} = y_{t-\tau_0} - \gamma_0 p_0 \quad \text{Eq. (11)}$$

for the $\tau_0$ signal path delay, and as $$y_{t-\tau_1}^{new} = y_{t-\tau_1} - \gamma_1 p_1 \quad \text{Eq. (12)}$$

for the $\tau_1$ signal path delay, where the $\gamma_0$ and $\gamma_1$ terms represent the correlated interference estimates determined, for example, by the interference estimation circuit 48, for the two probing finger locations.

The optimal value for the interference estimate $\gamma_i$ is determined as the value minimizing the mean squared error given by $$\gamma_i = \frac{\hat{h}_i^* \hat{h}_j I_{or}}{\left(|\hat{h}_i|^2 + |\hat{h}_j|^2\right) I_{or} + I_{oc}}, \quad i = 0, 1, j = 1 - i \qquad \text{Eq. (13)}$$

where i is the index for the current probing finger position and j is the index for the other probing finger position, $\hat{h}_i$ is the "channel" estimate for the ith probing finger, is $\hat{h}_j$ the "channel" estimate for the jth probing finger, and, in a wireless communication network example, $I_{or}$ is the total transmitted power from a serving base station supporting the communication receiver 10, i.e., $I_{or}$ represents the amount of the intra-cell interference, and $I_{oc}$ represents noise and inter-cell interference, which may be treated as white noise. Note that the communication receiver 10 may comprise a cellular telephone or other wireless communication device operating in a wireless communication network having a plurality of base stations transmitting in potentially overlapping radio service areas (cells or sectors), and thus the communication receiver may receive CDMA signals from a plurality of sources.

With Eq. (11) and Eq. (12) in mind, the new despread signal vector is compensated for colored interference and is given as $$Y_{new} = [y_{t-\tau_0}^{new}, y_{t-\tau_1}^{new}, y_{t-\tau_2}] \qquad \text{Eq. (14)}$$

where the signal finger output for the weakest path ($\tau_2$) is not compensated. With Eq. (14), the output from the combining circuit 50, when colored interference suppression is active, becomes an approximated or simplified form of G-RAKE combining and is denoted as $$D_{GRAKE_{appx}} = \hat{H}_C^H \hat{\Sigma}^{-1} Y_{new} \qquad \text{Eq. (15)}$$

In addition to the simplified form of colored interference suppression offered by the use of $\gamma_i p_i$ terms as colored interference compensation terms for corresponding ones of the Rake signal finger outputs, the Rake receiver 18 offers, in one or more embodiments, further processing advantages. More particularly, the Rake receiver circuit 18 adopts a simplified method of generating the interference estimates $\gamma_i$. In such embodiments, the interference estimates incorporate a scaling factor, $\alpha$, which determines whether, or to what extent, the Rake combined signal output by the combining circuit 50 is compensated for colored interference. In one embodiment, the scaling factor is incorporated as $$\gamma_i^{GRAKE_{appx}} = \alpha \frac{\hat{h}_i^* \hat{h}_j}{\left(|\hat{h}_i|^2 + |\hat{h}_j|^2\right)}, \quad i = 0, 1, j = 1 - i \qquad \text{Eq. (16)}$$

The above simplified approach obviates the need for receiving or estimating the values of $I_{or}$ and/or $I_{oc}$. In more detail, the scaling factor $\alpha$ may be adjusted to be an approximate inverse of a geometry factor representing the ratio between $I_{or}$ and $I_{oc}$. More broadly, the scaling factor $\alpha$ can be adjusted as a function of current operating conditions, including consideration of any one or more of the following terms: received signal spreading factor, CPICH signal-to-noise ratio (SIR) or other received signal quality measure, CPICH chip energy to total signal and interference energy ratio ($E_c/I_o$) or other received signal strength measure, and soft handoff conditions. As one example, the scaling factor $\alpha$ as given in Eq. (16) can be decreased with increasing spreading factor, or with decreasing signal quality, such that colored interference cancellation is deemphasized, or not used at all, if conditions do not favor its use.

With Eq. (16), the Rake signal finger vector is given as $$Y_{GRAKE_{appx}} = [y_{t-\tau_0}^{GRAKE_{appx}}, y_{t-\tau_1}^{GRAKE_{appx}}, y_{t-\tau_2}] \qquad \text{Eq. (17)}$$

where the values for Eq. (17) are obtained by substituting the simplified interference estimates of Eq. (16) into Eq. (14). With Eq. (17), the Rake combined signal output by the combining circuit 50, if colored interference compensation is active, is given as, $$D_{GRAKE_{appx}} = \hat{H}_C^H \hat{\Sigma}^{-1} Y_{GRAKE_{appx}} \qquad \text{Eq. (18)}$$

From the above equations, and Eq. (17) in particular, it may be appreciated that if the Rake receiver 18 operates without colored interference compensation, its Rake combining weights, w, are generated as first combining weights, which depend only on the complex channel estimates calculated for the signal delays, and on the (white) noise power corresponding to those delays. Conversely, if the Rake receiver operates with colored interference compensation, it effectively uses compensated combining weights, which are obtained by combining second combining weights—i.e., the probing finger interference estimates obtained from Eq. (16)—with the first combining weights embodied in the Rake signal finger outputs Y. Notably, the extent to which the second combining weights alter the first combining weights can be controlled by adjusting the scaling factor $\alpha$. In other words, the scaling factor $\alpha$ can be controlled such that the Rake receiver circuit 18 operates with no colored interference compensation, full colored interference compensation, or with partial (attenuated) colored interference compensation.

In one embodiment, a look-up table of values for the scaling factor $\alpha$ is stored in the memory 52, or elsewhere within the communication device 10, such that the Rake receiver circuit 18 uses different values of $\alpha$ responsive to changes in current operating conditions. For example, the Rake receiver circuit 18 may track changes bearing on the actual geometry factor, and use those changes to index into the look-up table, to retrieve different values of $\alpha$. Such a table may be predefined, such as by storing empirically collected data, e.g., simulation data, which reflects the appropriate value of $\alpha$ to use over changing conditions.

As one example of how spreading factor bears on the actual geometry factor, one may note that a low spreading factor, e.g., 8, in combination with a relatively high data rate, e.g., 384 kbps, suggests a favorable $I_{or}$ to $I_{oc}$ ratio. Similarly, the fact that the communication receiver 10 is in soft handoff would suggest a relatively poor geometry factor—i.e., operation of the communication receiver 10 within a boundary area of overlapping radio coverage between network cells or sectors. The scaling factor $\alpha$ can be adjusted in these and other cases, to reflect whether, and to what extent, colored interference suppression is desired given current operating conditions.

As a general proposition, the simplified colored interference compensation taught herein is less preferred when soft handoff is active, when the received signal strength or SIR is low, or when the spreading factor is too high. Thus, in one embodiment, the Rake receiver circuit 18 evaluates one or more parameters bearing on current operating conditions and determines whether to operate with or without colored interference compensation.

Broadly, then, from Eq. (16), one sees that the extent to which colored interference compensation is included in the Rake combined signal output by the combining circuit 50 can be controlled by controlling the value of the scaling factor $\alpha$. For example, the extent to which the $\gamma_i^{GRAKE_{appx}}$ terms contribute to combining weight formation can be controlled by setting the value of $\alpha$. For colored interference compensation, $\alpha$ can be adjusted to operate as a unity-gain (or close to unity gain) term. Conversely, for little or no colored interference compensation, $\alpha$ can be adjusted to operate as a substantially less than unity gain term (e.g., zero). Of course, if $\alpha$ is used in the denominator of Eq. (16), then setting $\alpha$ larger reduces colored interference compensation, and setting it smaller increases colored interference compensation.

In one embodiment, the Rake receiver circuit 18 sets the scaling factor $\alpha$ to a first fixed value if colored interference compensation is desirable and to a second fixed value if colored interference compensation is not desired. That is, the Rake receiver circuit 18 selects operation in a first mode, where colored interference is not compensated, by selecting a value of $\alpha$ that eliminates or substantially suppresses the effect of the interference estimates generated by the interference estimation circuit 48 for the probing fingers. Similarly, the Rake receiver circuit 18 selects operation in a second mode, where colored interference is suppressed, by selecting a value of $\alpha$ that results in non-zero interference estimates for compensating the Rake signal finger outputs. In these and other embodiments, the extent of colored interference compensation can be controlled as a function of current operating conditions. For example, the scaling factor $\alpha$ may range from 0.3 to 1 as a function of any one or more of changing spreading factors, signal qualities, communication service type (e.g., voice or data), etc.

With the above embodiments in mind, those skilled in the art will recognize that the Rake receiver circuit 18 effectively offers modal operation regarding the compensation of colored interference. In one embodiment, the Rake receiver circuit 18 operates in a first mode where colored interference compensation is inactive, if current operating conditions make such compensation undesirable. Conversely, the Rake receiver circuit 18 operates in a second mode where colored interference compensation is active, if current operating conditions make such compensation desirable. Moreover, through its use of a scaling factor that scales the colored interference estimates used in the second mode, the Rake receiver circuit 18 can switch between the first and second modes by adjusting the scaling factor—i.e., the first mode may be considered a special case of the second mode. Further, in one or more embodiments, the Rake receiver circuit 18 uses scaling factor adjustment in the second mode to control the extent of colored interference compensation, meaning that greater (or lesser) compensation can be used when current operating conditions suggest better (or poorer) compensation performance.

Of course, the present invention is not limited by the foregoing discussion, nor is it limited by the accompanying drawings. Indeed, the present invention is limited only by the following claims, and their legal equivalents.

What is claimed is:

1. A method of operating a Rake receiver circuit in a communication receiver, the method comprising:
   in a first operating mode, generating Rake combining weights as first combining weights calculated from channel estimates corresponding to a set of Rake signal fingers; and
   in a second operating mode, generating the Rake combining weights as compensated combining weights obtained by compensating the first combining weights with second combining weights calculated from colored interference estimates obtained from a set of Rake probing fingers.

2. The method of claim 1, further comprising forming a Rake combined signal for further received signal processing by combining output signals from the set of Rake signal fingers according to the Rake combining weights.

3. The method of claim 1, further comprising calculating the second combining weights by determining Rake probing finger positions based on one or more strongest Rake signal finger positions, and determining a colored interference estimate for each Rake probing finger based on a scaling factor and probing finger signals output from the Rake probing fingers.

4. The method of claim 3, further comprising selecting the first operating mode or the second operating mode by selling a value of the scaling factor.

5. The method of claim 4, wherein selecting the second operating mode comprises setting the scaling factor such that it operates as or close to a unity gain term in the colored interference estimates, and selecting the first operating mode comprises setting the scaling factor such that it operates as a less-than-unity gain term in the colored interference estimates.

6. The method of claim 3, further comprising determining an extent of colored interference compensation included in the compensated combining weights by adjusting the scaling factor.

7. The method of claim 6, further comprising adjusting the scaling factor as a function of current operating conditions at the communication receiver.

8. The method of claim 3, wherein, at least in the second operating mode, the scaling factor is based on an approximation of a geometry factor relating serving base station transmit power to total received noise power at the communication receiver.

9. The method of claim 1, further comprising selecting the first operating mode if the communication receiver is in soft handoff, or if Rake probing fingers are not available to support operation in the second operating mode.

10. The method of claim 1, further comprising selecting the first operating mode if one or more desired Rake probing finger locations are within a defined delay range of one or more Rake signal finger locations.

11. The method of claim 1, further comprising conditionally selecting the second operating mode if the communication receiver is not in soft handoff, and if Rake probing fingers are available to support operation in the second operating mode.

12. The method of claim 11, wherein conditionally selecting the second operating mode if the communication receiver is not in soft handoff, and if Rake probing fingers are available to support operation in the second operating mode, comprises evaluating current operating conditions at the communication receiver to determine whether to operate in the second operating mode or the first operating mode.

13. The method of claim 12, wherein evaluating current operating conditions at the communication receiver comprises evaluating one or more of a received signal quality, a received signal strength, and a received signal spreading factor.

14. A Rake receiver circuit for use in a communication receiver, the Rake receiver circuit comprising one or more processing circuits configured to:
   generate Rake combining weights in a first mode of operation as first combining weights calculated from channel estimates corresponding to a set of Rake signal fingers; and
   generate the Rake combining weights in a second mode of operation as compensated combining weights obtained by compensating the first combining weights with second combining weights calculated from colored interference estimates corresponding to a set Rake probing fingers.

15. The Rake receiver circuit of claim 14, further comprising a combining circuit configured to form a Rake combined signal for further received signal processing at the communication receiver by combining signal finger output signals from the set of Rake signal fingers according to the Rake combining weights.

16. The Rake receiver circuit of claim 14, wherein the one or more processing circuits include a finger placement circuit configured to determine Rake probing finger positions based on one or more strongest Rake signal finger positions, and a weight calculator circuit configured to calculate the second combining weights by determining a colored interference estimate for each Rake probing finger based on a scaling factor and probing finger signals output from the Rake probing fingers.

17. The Rake receiver circuit of claim 16, wherein the one or more processing circuits include an interference compensation control circuit configured to select the first mode of operation or the second mode of operation by adjusting the scaling factor.

18. The Rake receiver circuit of claim 16, wherein the one or more processing circuits include an interference compensation control circuit configured to determine an extent of interference compensation included in the compensated combining weights by adjusting the scaling factor.

19. The Rake receiver circuit of claim 18, wherein the interference compensation control circuit is configured to adjust the scaling factor as a function of current operating conditions at the communication receiver.

20. The Rake receiver circuit of claim 16, wherein, at least in the second mode of operation, the scaling factor comprises an approximation of a geometry factor relating serving base station transmit power to total received noise power at the communication receiver.

21. The Rake receiver circuit of claim 14, wherein the one or more processing circuits are configured to select the first mode of operation if the communication receiver is in soft handoff, or if Rake probing fingers are not available to support operation in the second mode of operation.

22. The Rake receiver circuit of claim 14, wherein the one or more processing circuits are configured to select the first mode of operation if one or more desired Rake probing finger locations are within a defined delay range of one or more Rake signal finger locations.

23. The Rake receiver circuit of claim 14, wherein the one or more processing circuits are configured to conditionally select the second mode of operation if the communication receiver is not in soft handoff, and if Rake probing fingers are available to support operation in the second mode of operation.

24. The Rake receiver circuit of claim 23, wherein the one or more processing circuits are configured to conditionally select the second mode of operation by evaluating current operating conditions at the communication receiver to determine a desirability of operating with or without colored interference compensation.

25. The Rake receiver circuit of claim 24, wherein the one or more processing circuits are configured to evaluate current operating conditions at the communication receiver by evaluating one or more of a received signal quality, a received signal strength, and a received signal spreading factor.

26. A wireless communication receiver comprising the Rake receiver circuit of claim 14.

27. A method of operating a Rake receiver circuit in a communication receiver, the method comprising:
 calculating Rake combining weights for a set of Rake signal fingers based on channel estimates corresponding to Rake signal finger positions;
 compensating the Rake combining weights for colored interference in dependence on determining a desirability of colored interference compensation; and
 forming a combined signal for further processing by combining finger signals from the set of Rake signal fingers according to the compensated Rake combining weights.

28. The method of claim 27, wherein determining the desirability of colored interference compensation comprises evaluating one or more of a soft handoff status of the communication receiver, an availability of Rake probing fingers for colored interference determination, proximities of Rake probing finger positions relative to strongest ones of the Rake signal finger positions, a received signal quality, and a received signal spreading factor.

29. The method of claim 27, wherein compensating the Rake combining weights for colored interference in dependence on determining a desirability of colored interference compensation comprises not compensating the Rake combining weights for colored interference in a first mode of operation where colored interference compensation is not desired, and compensating the Rake combining weights for colored interference in a second mode of operation where colored interference compensation is desired.

30. The method of claim 29, further comprising selectively operating in the first and second modes.

* * * * *

UNITED STATES PATENT AND TRADEMARK OFFICE
CERTIFICATE OF CORRECTION

PATENT NO. : 7,680,176 B2  Page 1 of 1
APPLICATION NO. : 11/412543
DATED : March 16, 2010
INVENTOR(S) : Lindoff et al.

It is certified that error appears in the above-identified patent and that said Letters Patent is hereby corrected as shown below:

In Column 7, Line 22, delete " $\hat{H}_C = \{\hat{h}_C^i\} = 0, \ldots, d-1$ " and insert -- $\hat{H}_C = \{\hat{h}_C^i\}, i = 0, \ldots, d-1$ --, therefor.

In Column 12, Line 13, in Claim 4, delete "selling" and insenrt -- setting --, therefor.

Signed and Sealed this

Fifteenth Day of June, 2010

David J. Kappos
*Director of the United States Patent and Trademark Office*